US006442346B1

United States Patent
Constable et al.

(10) Patent No.: US 6,442,346 B1
(45) Date of Patent: Aug. 27, 2002

(54) FLASH APPARATUS WITH ONE-TIME-USE CAMERA

(75) Inventors: Douglas W. Constable, Rochester; Michael R. Allen, Churchville, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/536,182

(22) Filed: Mar. 27, 2000

(51) Int. Cl.⁷ .......................... G03B 15/03; G03B 17/02
(52) U.S. Cl. .................. 396/155; 396/6; 396/158; 396/171; 396/176; 396/198
(58) Field of Search .................. 396/6, 28, 155, 396/158, 171, 172, 176, 182, 198, 199

(56) References Cited

U.S. PATENT DOCUMENTS

| | | |
|---|---|---|
| 4,049,996 A | 9/1977 | Vital et al. |
| 4,903,058 A | 2/1990 | Schappler |
| 4,973,998 A | 11/1990 | Gates |
| 5,003,330 A * | 3/1991 | Kotani et al. ............... 396/176 |
| RE34,168 E | 1/1993 | Ohmura et al. |
| 5,384,611 A | 1/1995 | Tsuji et al. |
| 5,678,075 A * | 10/1997 | Doukas ..................... 396/171 |
| 5,721,971 A | 2/1998 | Sasaki |
| 5,752,097 A | 5/1998 | McIntyre |
| 5,761,541 A | 6/1998 | Constable et al. |
| 5,781,804 A | 7/1998 | Constable |

FOREIGN PATENT DOCUMENTS

JP 9-54362 2/1997

* cited by examiner

Primary Examiner—Russell Adams
Assistant Examiner—Arthur Smith
(74) Attorney, Agent, or Firm—Frank H. Boos, Jr.; Roland R. Schindler, II

(57) ABSTRACT

A one-time-use camera with a built-in flash, an external flash unit therefor and system in which the camera and external flash unit have mating mounting structures enabling the external flash unit to be mounted on the camera in manner that blocks direct flash emission from camera flash unit onto a subject being photographed and the flash emission device of the external flash unit is positioned farther away from the camera taking lens than the built-in flash thereby substantially eliminating red-eye effect on the subject being photographed. The external flash unit includes a flash re-directing channel which directs built-in flash emission generally upwards to provide indirect illumination of the photographed subject. A camera ready light enable/disable circuit in the external flash unit is connected to the camera ready light to disable normal operation of the ready light until the external flash unit is fully charged thereby enabling the camera user to rely solely on the camera ready light as an indicator of when the camera and external flash units are ready for taking the next picture. The external flash unit is also provided with a user-operated start switch that simultaneously starts flash charger operation in both the camera and external flash unit.

20 Claims, 12 Drawing Sheets

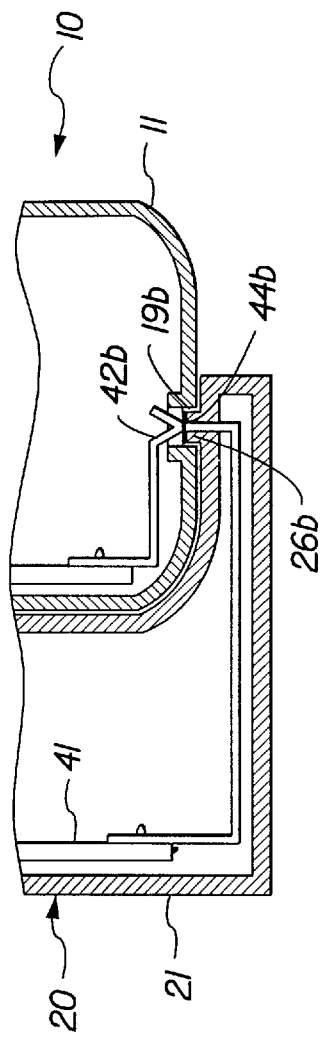
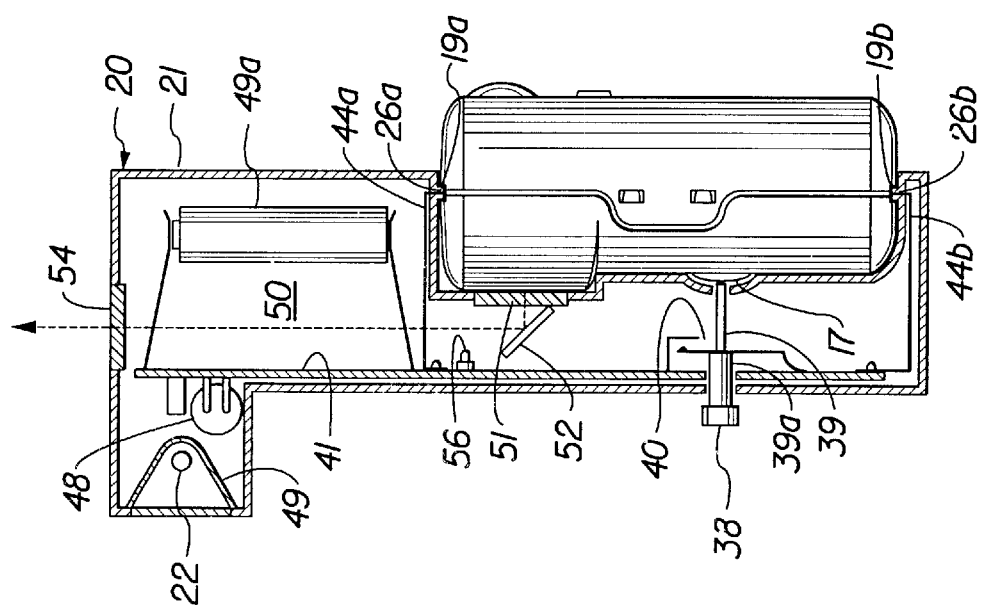
FIG. 5b
FIG. 5a

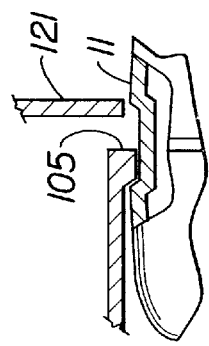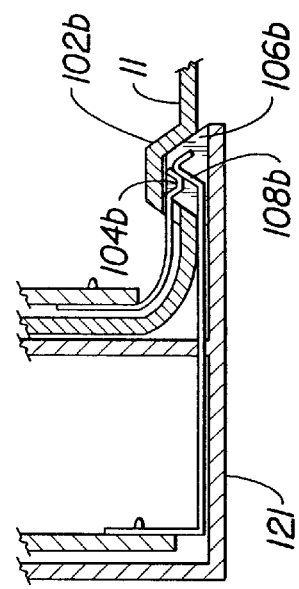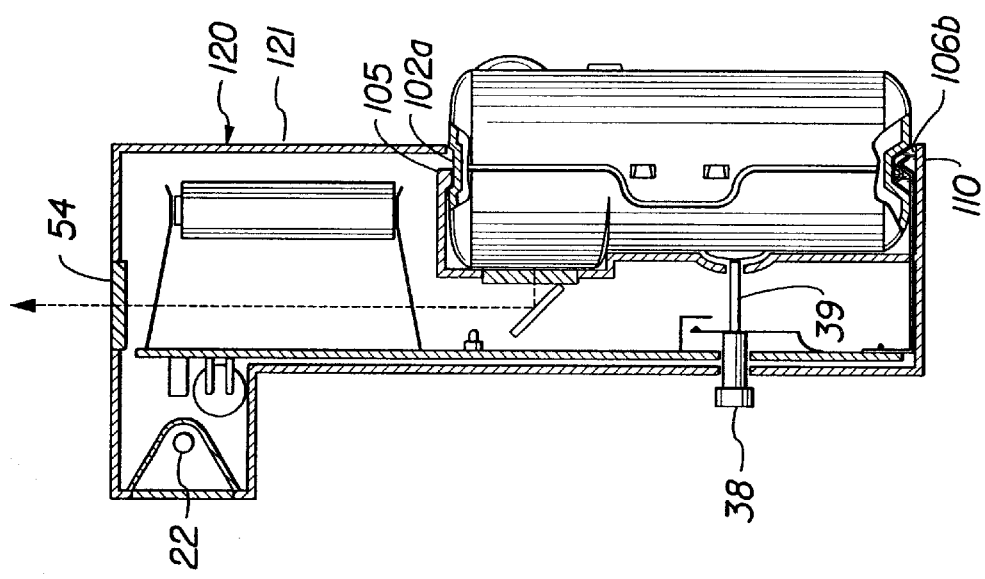

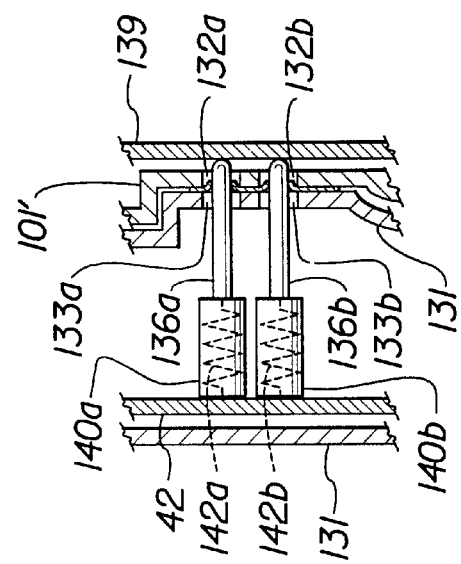
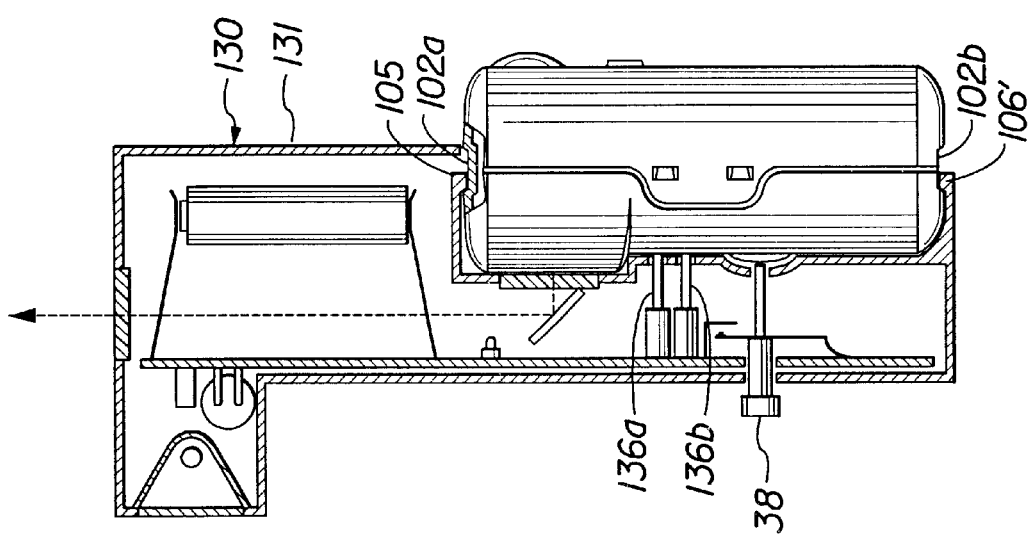

FLASH APPARATUS WITH ONE-TIME-USE CAMERA

CROSS REFERENCE TO RELATED APPLICATION

Reference is made to co-pending U.S. application Ser. No. 09/535,870 entitled ONE-TIME-USE CAMERA WITH EXTERNAL FLASH UNIT, Douglas W. Constable, filed concurrently herewith.

FIELD OF THE INVENTION

The invention relates generally to the field of photography, and in particular to attachable flash apparatus useful with one-time-use cameras.

BACKGROUND OF THE INVENTION

One-time-use cameras are rapidly gaining in popularity due to in large part to their convenience and low cost relative to user-reloadable cameras. Many of such cameras include a built-in flash device to enable indoor picture taking. For cost reasons, such flash devices are typically fixed in place and, because of the small size of the cameras, are necessarily located close to the optical axis of the taking lens. As a result, the phenomenon known as "red-eye" becomes a problem. Red-eye occurs when flash light is reflected by a subject's retina through the taking lens onto the exposed image frame. Numerous techniques are known for reducing the red-eye effect. One of such techniques involves the use of a pop-up flash device that moves the flash emitter away from the optical axis of the taking lens. Such a built-in, pop-up arrangement, while effective, is costly to implement and would not be suitable for one-time-use cameras where cost must be kept at a minimum.

U.S. Pat. No. 5,384,611 discloses a user-reloadable camera with a retractable built-in flash and provision for attachment of an external flash. When the external flash is mounted on the camera, the retractable flash which is close to the optical axis of the taking lens is retracted into the camera and does not fire. Thus, the external flash unit and built-in flash unit do not fire simultaneously. Since the spaced, externally mounted flash is the sole source of flash emission, the red-eye effect is effectively eliminated. However, the disclosed arrangement involves the use of a retractable built-in flash with provision on the flash to electrically disable the built-in flash. Such an arrangement is costly to implement and would not be suitable for low cost one-time-use cameras.

There is therefore a need for a one-time-use camera system with an externally mountable flash unit that moves the point of direct subject flash emission away from the optical axis of the camera taking lens so as to eliminate or substantially reduce the red-eye effect without significantly adding to the cost of the camera itself.

SUMMARY OF THE INVENTION

In accordance with the invention, therefore, there is provided a one-time-use camera and detachable flash system which comprises a one-time-use camera having a taking lens, a fixed, built-in flash unit with a flash emission device and a first mounting structure accessible on an outer surface of the camera; and an external flash unit having a second flash emission device and a second mounting structure thereon configured to mate with the first mounting structure on the camera permitting the external flash unit to be detachably mounted on the camera with the second flash emission device spaced farther away from said taking lens than said first flash emission device, the external flash unit having a portion thereof which, when mounted on the camera, physically blocks direct illumination by flash light actually emitted from the camera built-in flash unit of a subject being photographed; whereby red eye effect on photographed subjects is substantially eliminated.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 5a is a side elevation view of the camera system of FIG. 2 with the external flash unit shown in section;

FIG. 5b is a cutaway detail of a portion of the FIG. 5 camera system showing details of mounting and electrical connection arrangements therefor;

FIG. 9a is a side elevation view of the camera system of FIG. 8 with the external flash unit shown in section;

FIGS. 9b and 9c are cutaway views of portions of the camera system of FIG. 9a showing details of the mounting and electrical connection arrangements therefor;

FIG. 12a is a side elevation view of the camera system of FIG. 11 with the external flash unit shown in section; and FIG. 12b is a cutaway view of a portion of the camera system of FIG. 12a showing details of the mounting and electrical connection arrangements therefor.

DETAILED DESCRIPTION OF THE INVENTION

Figure 1:
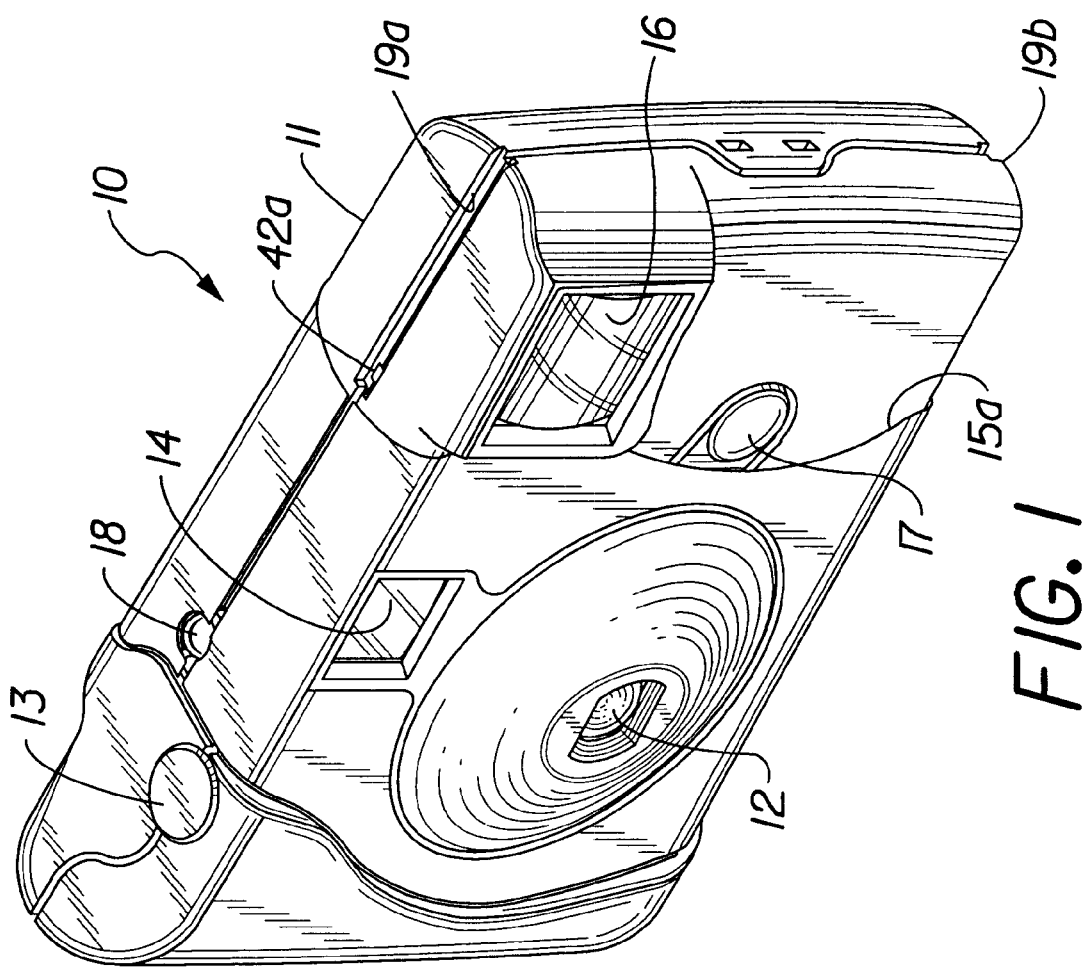
FIG. 1 is an isometric view of a one-time-use camera adapted for mounting of an external flash unit in accordance with a first embodiment of the present invention.
Figure 2:
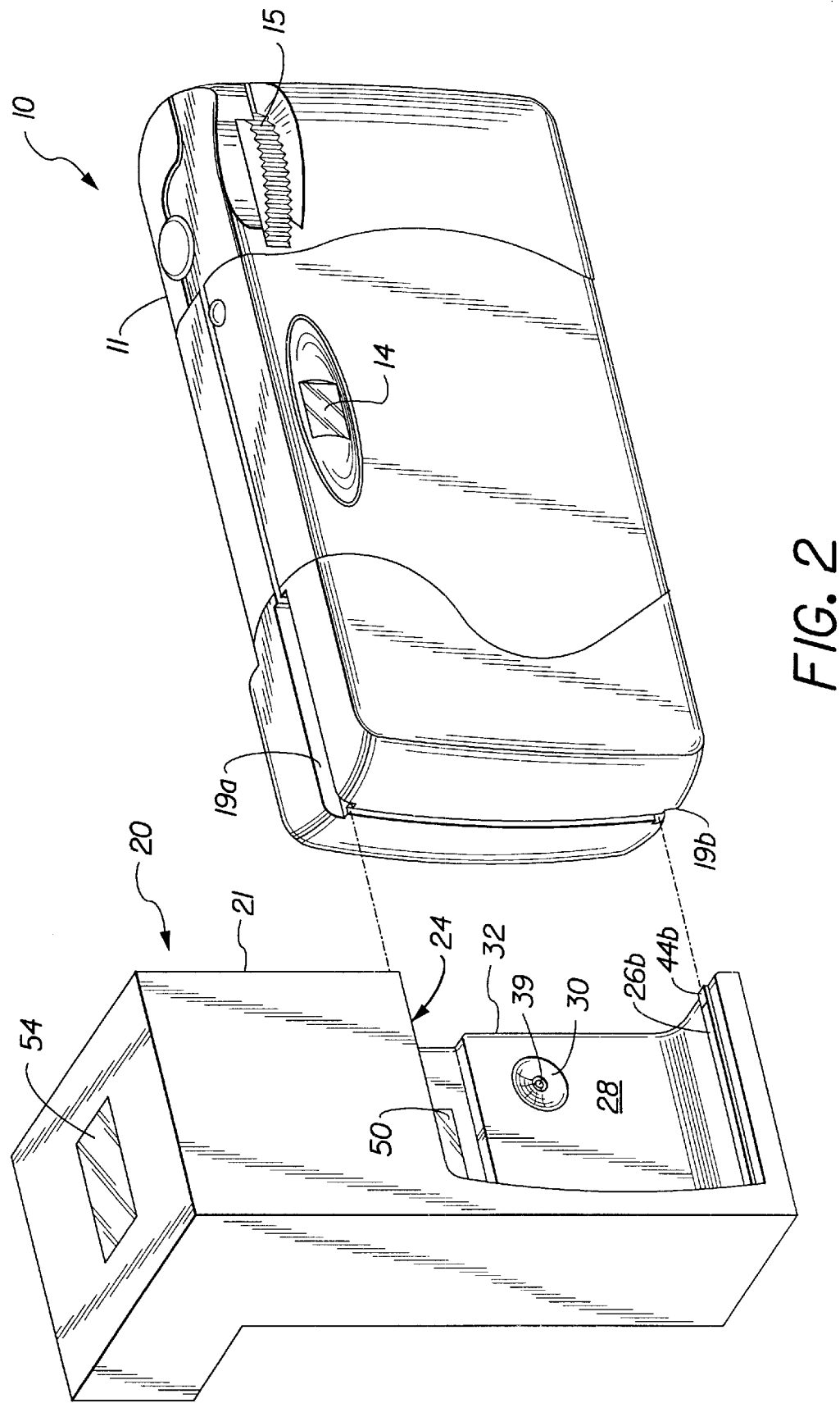
FIG. 2 is a rear isometric exploded view of a camera system according to the first embodiment of the invention.
Figure 3:
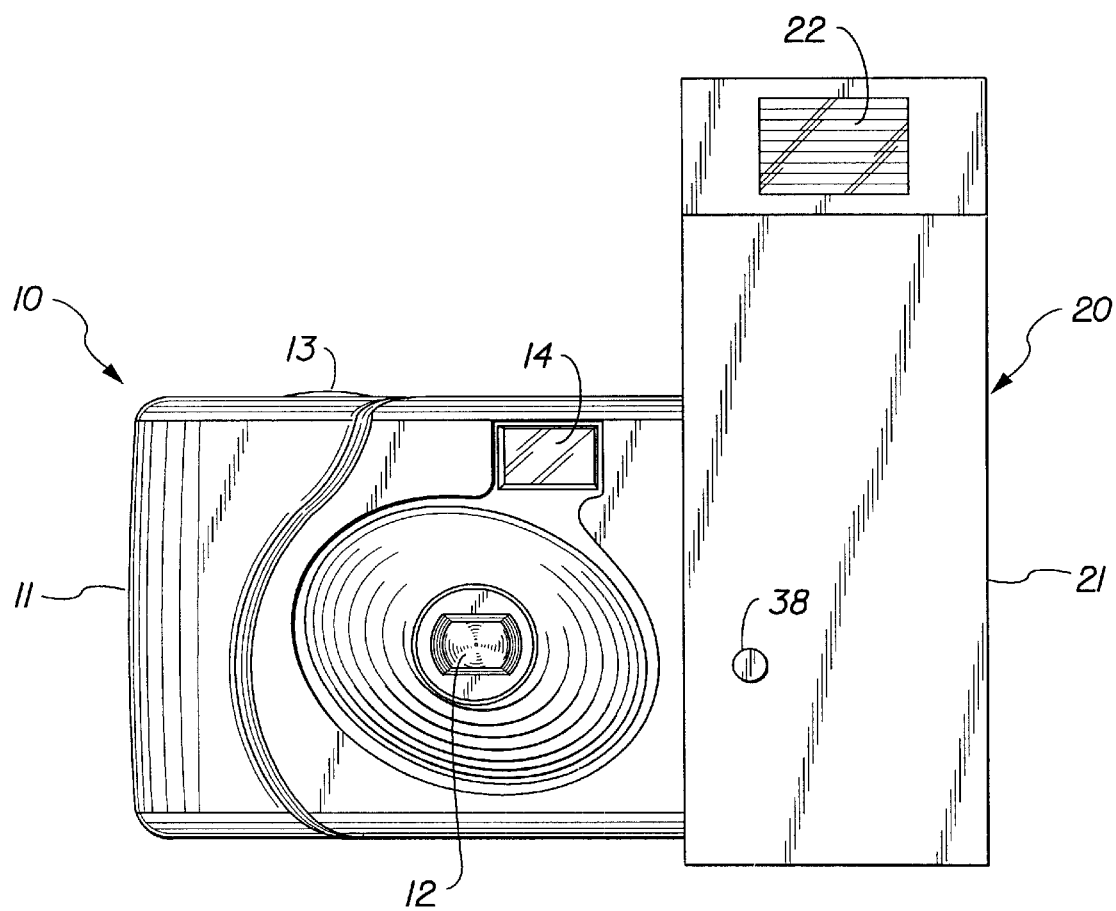
FIG. 3 is a front elevation view of the camera system of FIG. 2 with an external flash unit mounted on the camera.

Referring jointly to FIGS. 1–3, a one-time-use and detachable flash system is shown which comprises a one-time-use camera 10 and an external flash unit 20. The camera comprises a housing 11, a taking lens 12, a shutter release button 13, a viewfinder 14 and a film advance wheel 15. A label sheet 15a is typically placed around the front and back the camera to provide printed material such as operating instructions and a company logo. The label sheet also serves to hide any holes in the camera housing which might be used for circuit testing purposes and the like during manufacturing of the camera. The illustrated camera is provided with a built-in flash unit which includes a flash emission device 16, a flash charger start button 17 and a flash charge ready light 18. The trend in the design of a one-time-use camera is to make the camera as small as possible for the convenience of the user. It is also important to keep the manufacturing cost as low as possible. As the size of the camera is reduced, the built-in flash emission device 16 becomes closer to the optical axis of the taking lens which increases the red-eye effect, particularly when taking indoor pictures of human and animal subjects. The need to keep manufacturing costs as low as possible dictates against the use of pop-up flash devices which are commonly used in more costly user-reloadable cameras to temporarily move the flash emission device away from the optical axis of the taking lens for picture taking operations.

Figure 4:
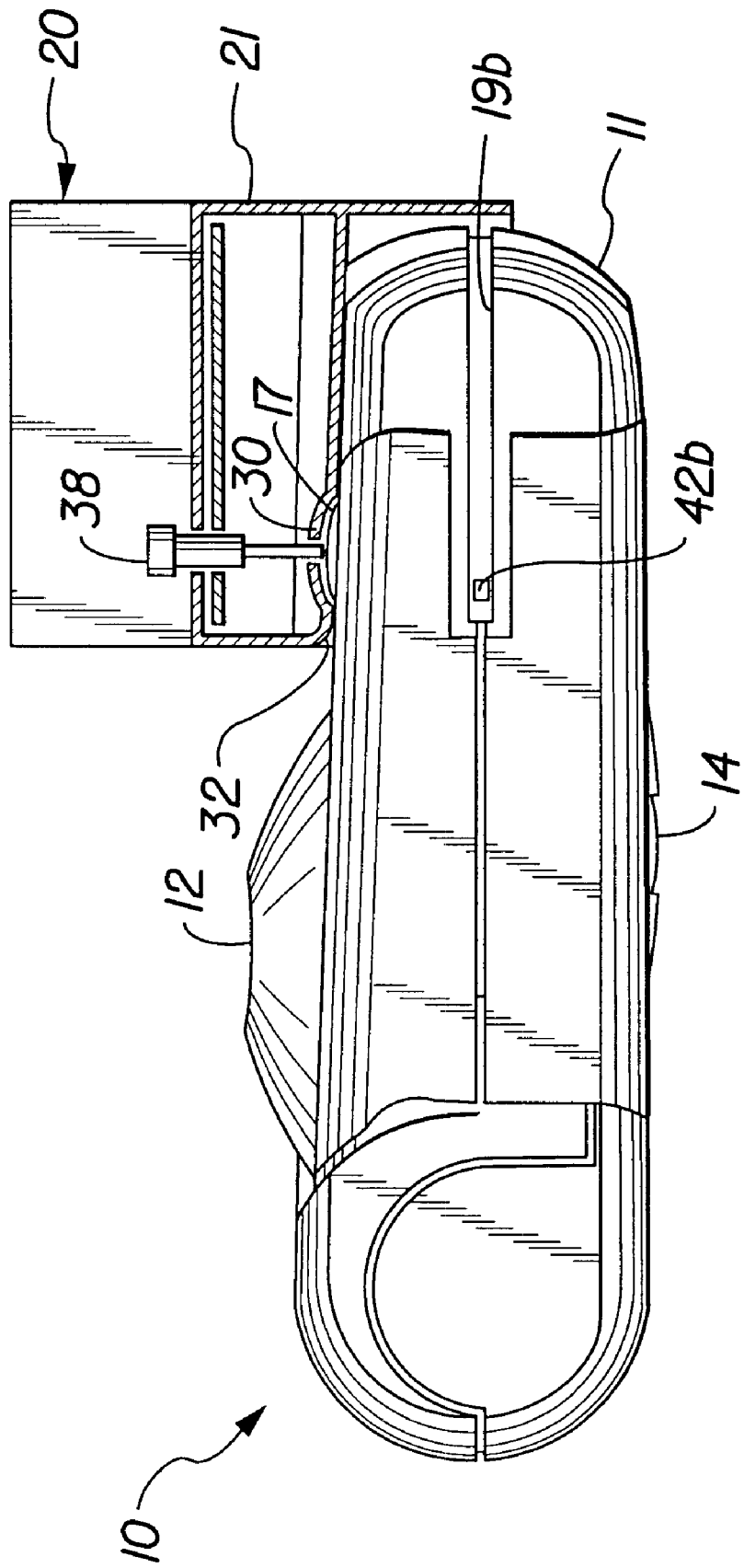
FIG. 4 is a bottom plan view of the camera system of FIG. 2 with the external flash unit shown in section.

In accordance with the system of the invention, an external flash unit 20 is provided to serve as the primary flash unit for the system with a flash emission device spaced sufficiently away from the taking lens optical axis to substantially eliminate the subject red-eye effect. To this end, camera 10 includes a mounting structure comprising, in the embodiment of FIGS. 1–3, a pair of elongated slots 19a and 19b formed in the upper and lower surfaces of the camera housing 11 and extending parallel to the long dimension of the camera. The external flash unit 20 comprises an elongated housing 21 having, at the upper end, a flash emission device 22. An open mounting chamber 24 in the lower portion of the housing 21 has a complementary pair of elongated ridges 26a and 26b (FIG. 5a) on the upper and lower surfaces, respectively, of the chamber. With the external flash unit positioned at the end of the camera, the ridges 26a and 26b align with and extend in the direction of the slots 19a and 19b and permit the external flash unit to be mounted into position on the camera as shown in FIG. 3 by sliding the ridges into the slots. As seen in FIGS. 2 and 4, the chamber surface 28 facing the front of the camera is provided with a spherical recess 30 that allows charger start button 17 to project slightly, in its normal manner, beyond the surface of camera housing 11 after the flash unit is mounted on the camera. A radiused portion 32 of the surface 28 comprises a detent which acts to depress the button 17 as the flash unit slides into its mounted position thereby to automatically start the flash charging circuit in the camera into its charging operation. A user operated plunger button 38 extends through the front surface of the flash unit 20 and includes a pin 39 that extends through the center of the spherical recess 30. An enlarged shaft portion 39a (FIG. 5a) engages a flexible electrical contact of switch 40 which is connected to a flash charging circuit on circuit board 41 mounted inside the external flash unit housing. With this arrangement, in accordance with an aspect of the invention, both the camera and external flash unit charging circuits may be restarted simultaneously be depressing button 38. The slots 19a, 19b and ridges 26a, 26b are provided, respectively, with mating electrical terminals 42a, 42b and 44a, 44b to enable electrical communication between the camera and external flash unit.

Referring to FIGS. 5a and 5b, external flash unit 20 is a self-contained unit having the necessary flash charging circuit, flash capacitor 48, flash emission device (flash tube) 22 and associated reflector 49 mounted within the unit housing and one or more power supply batteries 49a. A camera flash light redirecting channel 50 is structured in the external flash unit to direct flash light from the built-in flash emission device generally upward to provide a source of indirect illumination of a subject being photographed. This flash light redirecting channel 50 includes a transparent window panel 51 on the surface 28 which is located so as to align with the camera's built-in flash emission device 22 when the external flash unit is mounted on the camera. The channel further includes an angled mirror 52 and a transparent light exit window panel 54. A photosensor 56 is located in the light redirecting channel 50 to detect flash emission from the built-in camera flash to provide a trigger signal to initiate flash operation in the external flash unit. It will be appreciated that with the external flash unit mounted on the camera, direct flash illumination onto the subject is blocked by housing 21 of the external flash unit thereby preventing any red-eye effect which might normally occur from the built-in flash illumination. However, the built-in flash is nonetheless advantageously employed to provide "bounce" flash or indirect illumination on the subject.

Figure 6:
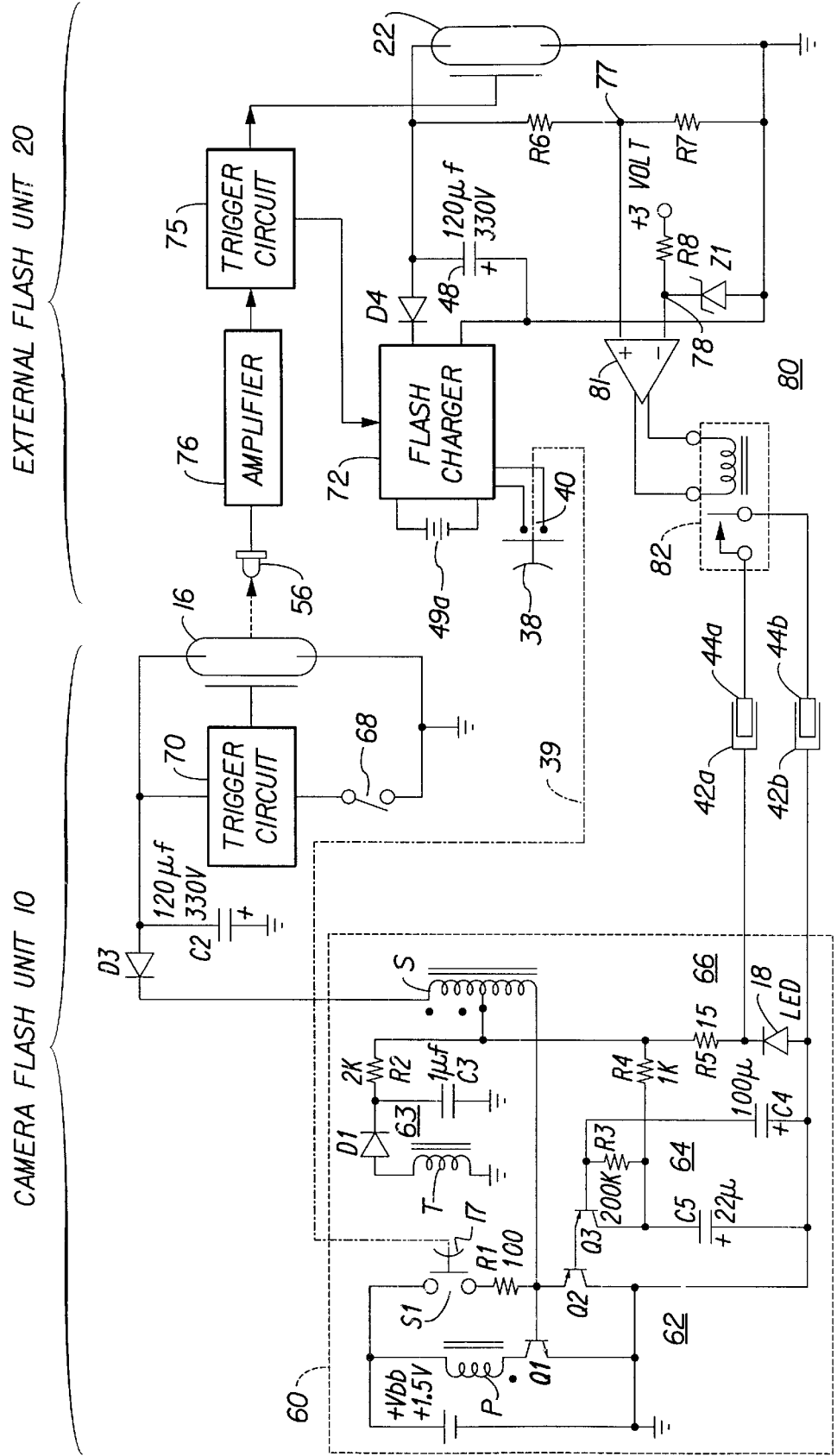
FIG. 6 is a partially schematic, block diagram of electronic circuits useful in the camera system of FIG. 2.
Figure 7:
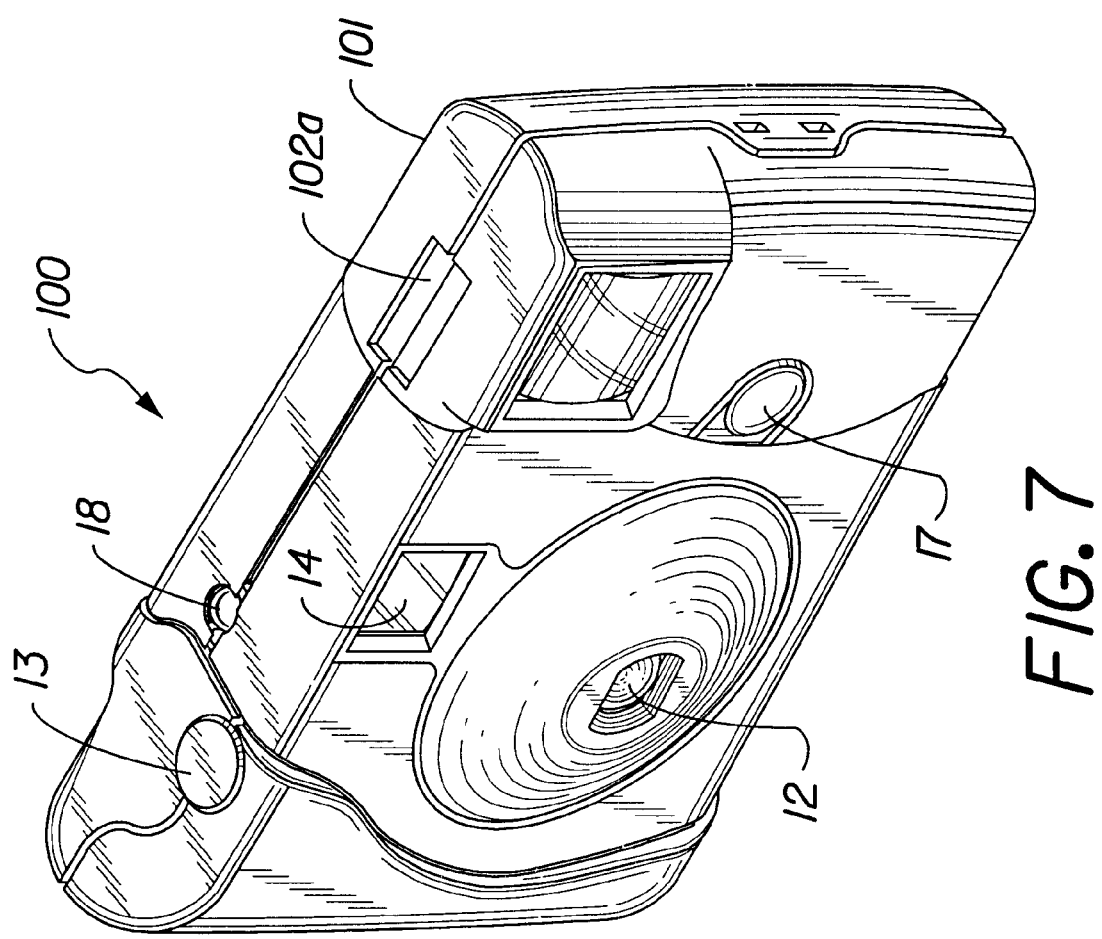
FIG. 7 is an isometric view of a one-time-use camera illustrating a second embodiment of the invention.

FIG. 6 shows circuits, partially in schematic and partially in block form, which may be used in the camera flash unit and the external flash unit. The camera flash unit comprises a charging circuit 60, a charge pulse rectifying diode D3, a main flash capacitor C2, a trigger circuit 70 and flash emission device 16. Trigger circuit 70 is activated by a trigger switch 68 when the camera lens shutter is opened to initiate flash emission from flash emission device 16, the flash emission being sustained by discharge of flash capacitor C2 through the device 16. Charging circuit 60 is more fully described in U.S. Pat. No. 5,781,804, the disclosure of which is incorporated herein by reference. Briefly, portion 62 is an oscillator circuit to generate pulses in transformer primary winding P which are stepped up in secondary winding S. The stepped up negative-going pulses are rectified by diode D3 to charge flash capacitor C2 to a full charge voltage of −300 volts, with −280 volts typically being sufficient to sustain flash emission from flash emission device 16. In the charging circuit 60, portion 63 is an optional bias supply circuit driven during charging operation by a few tertiary winding turns T inductively coupled to secondary winding S to provide a suitable DC bias current to the base of oscillator transistor Q1 to improve the operating efficiency of the oscillating circuit 62. Portion 64 is a timing circuit operative after the flash capacitor reaches full charge to sustain oscillation for a few minutes to insure retention of full charge on the flash capacitor thus giving the camera user time to compose and take the picture. Of particular interest to the present invention is portion 66 which comprises a charge ready indicating circuit including a light emitting diode LED (ready light 18) and resistor R5 connected in series from an intermediate tap on the secondary winding S to ground. During the charging of flash capacitor C2, negative pulses are generated across the indicator circuit 66 which gradually increase in voltage as the flash capacitor is charged. The position of the tap on secondary winding S is chosen such that negative pulses will begin to forward bias and illuminate the LED ready light 18 when sufficient negative charge is achieved on flash capacitor C2 to sustain flash emission from device 16. Unlike other ready light indicators which are directly connected to the flash capacitor, the LED in circuit 66 is operated at a low 1.5 volt level. The terminals of the LED ready light 18 are connected to the terminal connections 42a and 42b for reasons explained later.

In the external flash unit, the flash circuit includes a battery voltage supply 49a, flash charging circuit 72, trigger circuit 75, rectifier diode D4, main flash capacitor 48 and flash emission device 22. Photosensor 56 is connected through an amplifier 76 to trigger circuit 75 to initiate flash emission from device 22 in response to detection of flash emission from camera flash emission device 16. Charger circuit 72 is automatically restarted in known manner after each flash emission by a pulse feedback from trigger circuit 75. As previously described, a charger start switch 40 operates to manually start charging operation in circuit 72 and is mechanical by interconnected plunger 39 to camera charge start button 17 to simultaneously start charger circuit 60 when button 38 on the external flash unit is depressed.

Since the external flash unit has a charger circuit and main flash capacitor that are separate from the camera, it is necessary to provide an indication of when the flash capacitor in the external flash unit is ready to enable flash emission. Conventionally, this would be done with a separate ready light indicator in the external flash unit responsive to the charge level of the external unit's flash capacitor. However, in accordance with another aspect of the invention, provision is made for communication between the external flash unit and the camera flash unit to utilize the camera LED ready light 18 as the sole indicator of when the system is ready for taking a flash picture. To this end, the external flash unit circuit includes a camera ready light override circuit 80 connectable to the camera ready light 18 to disable normal operation of the camera ready light 18 unless and until the charge level of the external unit's flash capacitor 48 is sufficiently charged to a desired voltage lever, e.g. −280 volts sufficient to sustain flash emission by the external unit's flash emission device 22. In the illustrated embodiment, the override circuit 80 includes a comparator 81 with its positive input side connected to intermediate terminal 77 of a resistor voltage divider R6, R7 which is connected between the negative charge terminal of flash capacitor 48 and ground. The negative input side of comparator 81 is connected to a reference potential at terminal 78 established by zener diode Z1 connected from ground through resistor R8 to the +3 volt battery source. The values of resistors R6 and R7 are chosen such that, when flash capacitor 48 is sufficiently charged, the voltage on terminal 77 is the same as the reference voltage on terminal 78. The output of comparator 81 is coupled to a normally-closed solenoid actuated switch 82, the switch contacts of which are connected to contact terminals 44a and 44b.

In operation, with the external flash unit 20 mounted on the camera 10, and assuming the external unit flash capacitor is uncharged or at a low negative charge voltage, the camera ready light 18 is shorted out by the normally closed solenoid switch contacts in solenoid switch 82. When the flash charger circuit is started, either manually by depressing button 38 to close contacts 40, or automatically by feedback from trigger circuit 75 after taking a picture, flash capacitor 48 begins charging negatively. When the capacitor 48 negative charge voltage begins to exceed the −280 volt level sufficient to sustain discharge through flash emission device 22, the voltage at terminal 77 falls below the reference voltage on terminal 78. This causes the output of comparator 81 to change state and initiate current through the winding of solenoid switch 82. The resultant opening of the switch 82 contacts removes the short across camera LED ready light 18. At this point, the camera ready light 18 is enabled to operate as described above depending on the charge condition of the camera flash capacitor C2. On the other hand, if the camera flash capacitor C2 reaches the charge ready level before the external flash capacitor 48, the short across the camera LED ready light 18 prevents the light from being activated until the external flash capacitor reaches its charge ready level and solenoid switch 82 releases the short from across the camera LED ready light 18. This offers the convenience to the camera user of needing to check with only a single ready light existing on the camera to ensure that both flash units will fire when the picture is taken.

Figure 8:
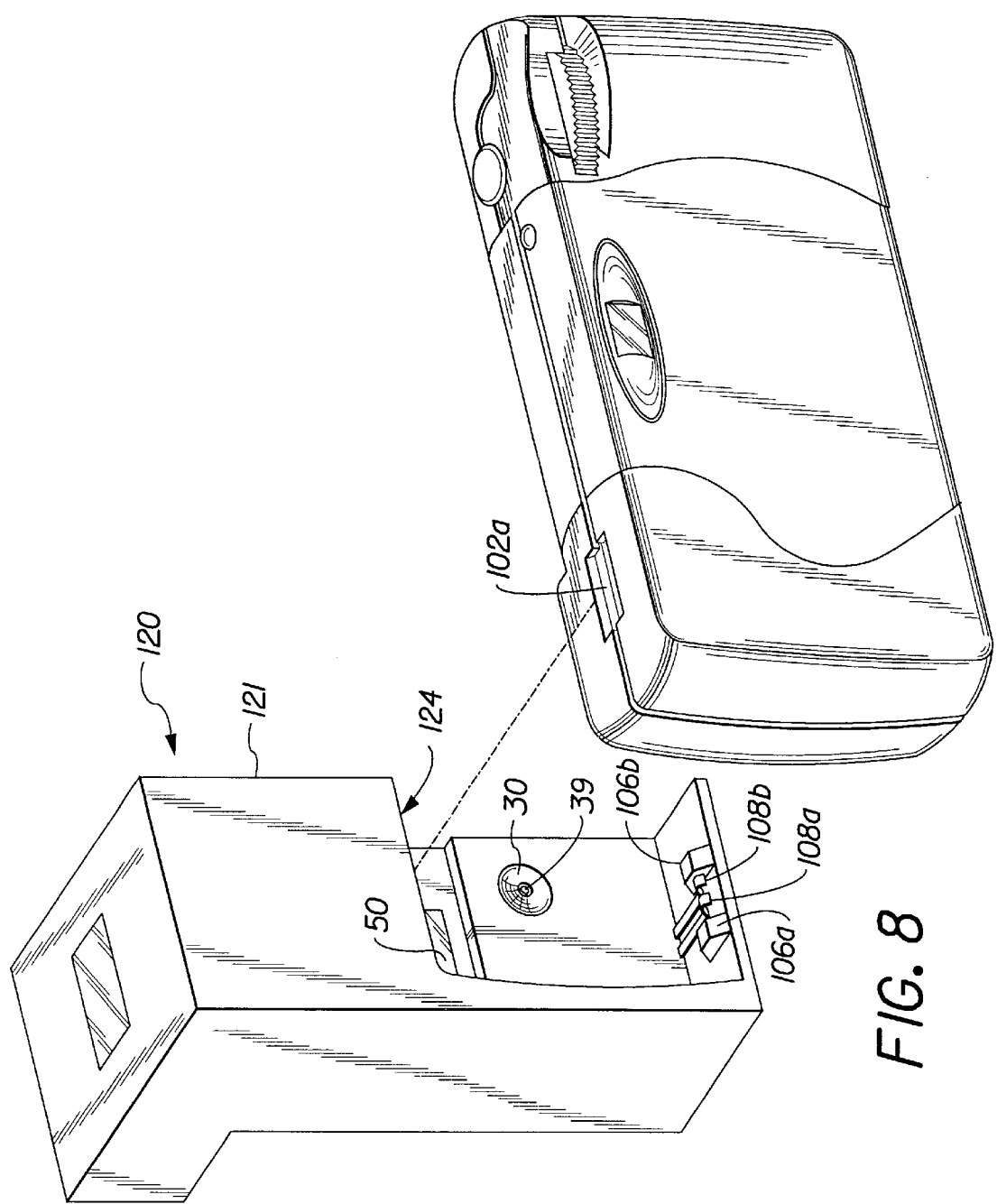
FIG. 8 is a rear isometric exploded view of the camera system according to the second embodiment of the invention.
Figure 10:
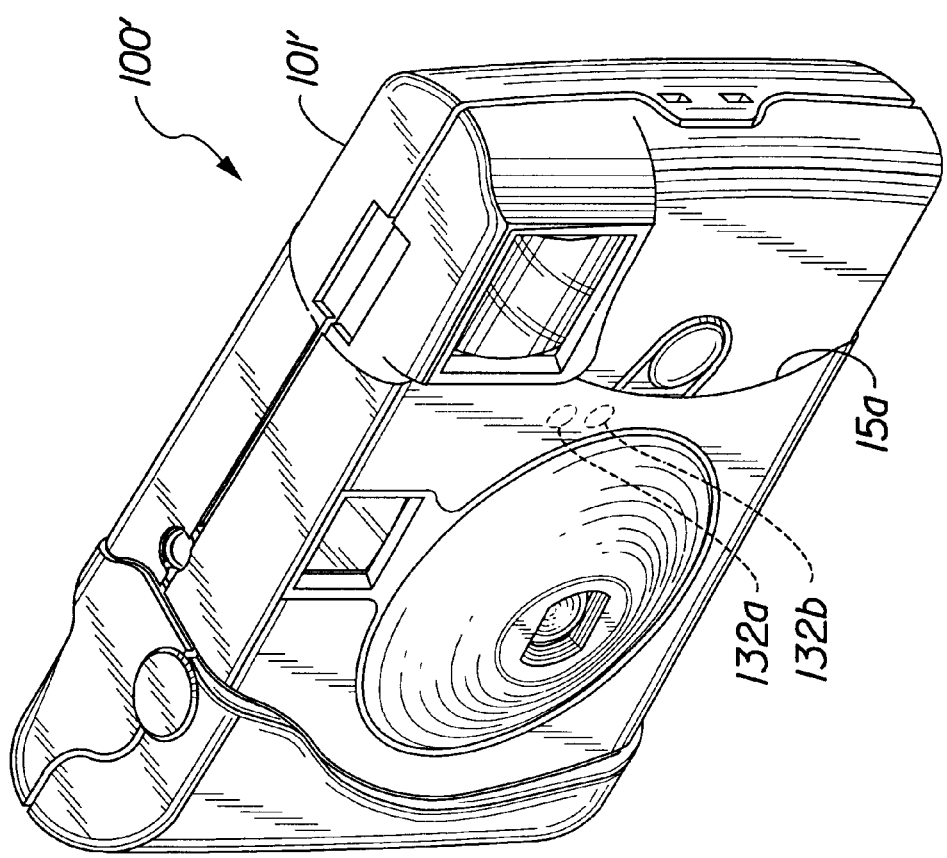
FIG. 10 is an isometric view of a one-time-use camera illustrating a third embodiment of the invention.
Figure 11:
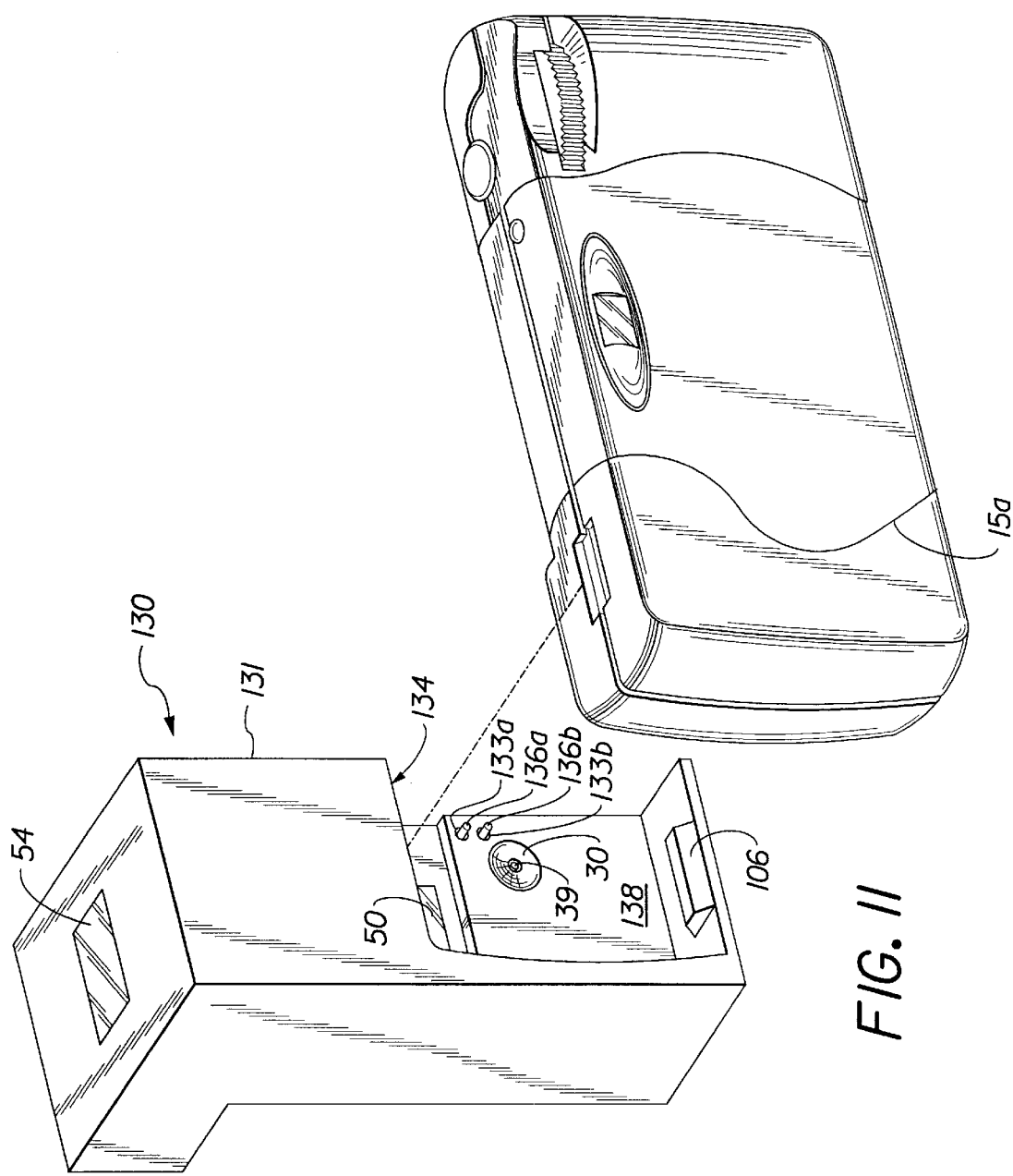
FIG. 11 is a rear isometric exploded view of the camera system according to the third embodiment of the invention.

FIGS. 7, 8 and 9a–9c illustrate an alternative embodiment of the camera and external flash unit system of the invention in which features of this system that are the same as those of the system of FIGS. 1–3 carry the same reference numerals. In this embodiment, a one-time-use camera 100 is provided with recesses 102a and 102b on upper and lower surfaces of the camera body 101. The external flash unit 120 includes a chamber 124 formed in the lower portion of the external unit housing 121. The chamber 124 includes a detent 105 on the upper surface of the chamber and a pair of separated detents 106a and 106b on the lower surface of the chamber. The detents and recesses are in mating alignment allowing the external flash unit to be snapped in place on the camera from the front as shown in FIG. 8. A pair of contacts 108a and 108b, leading from the solenoid switch 82 (FIG. 6) in the external flash unit, project between the detents 106a and 106b. FIG. 9b shows the connection between contact 108b and a terminal 104b in the lower recess 102b which leads to the camera ready light 18 as shown in FIG. 6. Another terminal (not shown) connects with contact 108a in similar fashion and also leads to camera ready light 18.

FIGS. 10, 11 and 12a–12b illustrate a further alternative embodiment of the camera and external flash unit system of the invention in which features of this system that are the same as those of the system of FIGS. 1–3 carry the same reference numerals. In this embodiment, the exposed electrical terminals on the camera 100' leading to the camera ready light 18 of the previous embodiments are eliminated. In their place, a pair of LED access holes 132a and 132b are formed in the front of the camera housing 101' to provide access to terminals on the internal printed circuit board connecting to the camera LED ready light 18 (FIG. 6). The external flash unit 130 is provided with contact pins 136a and 136b, colloquially referred to herein as "pogo pins". These pogo pins extend outwardly through holes 133a and 133b formed in the surface 138 of chamber 134. They are mounted on the internal printed circuit board 41 of the external flash unit 130 and are electrically connected to the solenoid switch as shown in FIG. 6. Preferably, the pogo pins are slidably journalled in cylinders 140a and 140b and are spring loaded by means of springs 142a and 142b. A continuous detent 106' is provided in the lower surface of chamber 134 for engagement with recess 102b in the bottom of camera housing 101'. In operation, when the external flash unit 130 is clipped onto the front of camera 100', with detents 105 and 106' lodged in recesses 102a and 102b, the pogo pins pierce the outer label 15a and are pressed against the LED terminal contacts on the circuit board 139 inside the camera. The spring loading of the pogo pins provides some spacing tolerance between the external flash unit and the camera and assures good electrical connection with the camera circuit board terminal contacts.

The invention has been described in detail with particular reference to certain preferred embodiments thereof, but it will be understood that variations and modifications can be effected within the spirit and scope of the invention.

PARTS LIST 10 camera
11 camera housing
12 taking lens
13 shutter release button
14 viewfinder
15 film advance wheel
15a camera label
16 flash emission device
17 flash charger start button 18 flash charge ready light
20 external flash unit
21 external flash unit housing
22 external flash emission device
24 mounting chamber
26a, b elongated ridges
28 chamber surface
30 spherical recess
32 radiused portion
38 plunger button
39 plunger pin
39a enlarged shaft portion
40 external charger start switch
41 circuit board-external flash unit
42a, b electrical terminals-camera
44a, b electrical terminals-external flash unit
48 flash capacitor-external flash unit
49 flash reflector
49a power supply batteries
50 flash redirecting channel
51 window
52 angled mirror
54 exit window panel
56 photosensor
60 camera charging circuit
63 bias supply circuit
64 charge timer circuit
66 charge ready indicator circuit
72 external flash charging circuit
75 trigger circuit
76 amplifier
77 intermediate terminal
78 reference terminal
80 ready light override circuit
81 comparator
82 solenoid actuated switch
100 camera
102a, b recesses
105 detent
106a, b detents
108a, b contacts
121 housing
124 chamber
132a, b LED access hole
133a, b holes in external flash unit surface 138
134 chamber
136a, b contact pins ("pogo pins")
138 external flash unit surface
139 camera printed circuit board
140a, b cylinder
142a, b springs
C2 flash capacitor-camera
D3 charge pulse rectifying diode
D4 rectifier diode-external flash unit
Q1 oscillator transistor
R6, 7 voltage divider circuit

What is claimed is:

1. A one-time-use camera and detachable flash system comprising:
   a one-time-use camera having a taking lens, a built-in flash unit with a first flash emission device and a first mounting structure accessible on an outer surface of the camera; and
   an external flash unit having a second flash emission device and a second mounting structure thereon configured to mate with the first mounting structure on the camera permitting the external flash unit to be detachably mounted on the camera with the second flash emission device spaced farther away from said taking lens than said first flash emission device, the external flash unit having a portion thereof which, when mounted on the camera, physically blocks direct illumination of a subject being photographed by flash light actually emitted from the first flash emission device;
   whereby red eye effect on photographed subjects is substantially eliminated and wherein said camera includes a first depressible button which starts a charging cycle in the built-in flash unit and the external flash unit includes a switch which, when closed, starts a charging cycle in the external flash unit, the external flash unit further including a second depressible button engaged with said switch and having an extension aligned with said first depressible button such that depression of said second button simultaneously starts charging operations in both of said camera built-in and external flash units.

2. The system of claim 1 wherein the first mounting structure comprises recesses on top and bottom surfaces of the camera and the second mounting structure comprises detents positioned to engage said recesses as said external flash unit is mounted onto the camera by pressing the external flash unit onto the camera in front of said first flash emission device.

3. The system of claim 1 wherein the first mounting structure comprises a pair of slots on opposing outer surfaces of the camera and the second mounting feature comprises a pair of elongated projections configured to slidably fit within said slots for mounting of said external flash unit on the camera.

4. The system of claim 3 wherein said slots and projections extend along a lengthwise dimension of said camera parallel with a front of the camera.

5. A one-time-use camera and detachable flash system comprising:
   a one-time-use camera having a taking lens, a built-in flash unit with a first flash emission device and a first mounting structure accessible on an outer surface of the camera; and
   an external flash unit having a second flash emission device and a second mounting structure thereon configured to mate with the first mounting structure on the camera permitting the external flash unit to be detachably mounted on the camera with the second flash emission device spaced farther away from said taking lens than said first flash emission device, the external flash unit having a portion thereof which, when mounted on the camera, physically blocks direct illumination of a subject being photographed by flash light actually emitted from the first flash emission device;
   whereby red eye effect on photographed subjects is substantially eliminated and wherein said camera includes a first flash capacitor and a flash ready light having first and second accessible contact terminals, said ready light indicating when charge voltage on said first flash capacitor is sufficient to sustain flash illumination by said first flash emission device; said external flash illumination unit including a second flash capacitor, an enable/disable circuit coupled to third and fourth contact terminals which are connected to said first and second contact terminals when said external flash unit is mounted on said camera, said enable/disable circuit normally holding said ready light in a disabled operating condition and being responsive to a charge voltage on said second flash capacitor which is sufficient to sustain flash illumination by said second flash illumination device to enable normal operation of said ready light.

6. The system of claim 5 wherein the first mounting structure comprises recesses on top and bottom surfaces of the camera and the second mounting structure comprises detents positioned to engage said recesses as said external flash unit is mounted onto the camera by pressing the external flash unit onto the camera in front of said first flash emission device; the first and second contact terminals are disposed in one of said camera recesses; and the third and fourth contact terminals are disposed in position to engage said first and second contacts in said one recess.

7. The system of claim 5 wherein the first mounting structure comprises a pair of slots on opposing outer surfaces of the camera and the second mounting feature comprises a pair of elongated projections configured to slidably fit within said slots for mounting of said external flash unit on the camera; said first and second contact terminals are positioned in at least one of said slots; and said third and fourth contact terminals are positioned in said elongated projections.

8. The system of claim 7 wherein said camera includes a depressible button which engages a momentary switch which starts a charging cycle in the built-in flash unit and the external flash unit includes a housing having a detent positioned to depress and release said button during sliding mounting of the external flash unit onto the camera, thereby automatically starting said charging cycle in the built-in flash unit.

9. A one-time-use camera comprising a mounting structure configured for mounting an external flash unit on the camera in a manner that causes the external flash unit to block actual flash illumination from the camera from directly illuminating a subject being photographed wherein said camera includes a flash ready light and externally accessible contact terminals connected to said ready light.

10. The one-time-use camera of claim 9 wherein said contact terminals are located in said mounting structure.

11. The one-time-use camera of claim 9 wherein said camera includes a housing defining holes which are positioned to provide access to said ready light contact terminals.

12. An external flash unit for a one-time-use camera of the type having a housing, a taking lens and a built-in flash unit including a first flash emission device, the external flash unit comprising:

a housing including a mounting structure configured to mount said external flash unit on said one-time-use camera in a manner that blocks direct illumination by flash illumination from camera built-in flash emission device of a subject being photographed wherein said camera includes a first flash capacitor and a flash ready light having first and second accessible contact terminals, said ready light indicating when charge voltage on said first flash capacitor is sufficient to sustain flash illumination by said first flash emission device; said external flash illumination unit further comprising:

a second flash capacitor, an enable/disable circuit coupled to third and fourth contact terminals which are so positioned as to connect to said first and second contact terminals when said external flash unit is mounted on said camera, said enable/disable circuit normally holding said ready light in a disabled operating condition and being responsive to a charge voltage on said second flash capacitor which is sufficient to sustain flash illumination by said second flash illumination device to enable normal operation of said ready light.

13. The external flash unit of claim 12 wherein said third and fourth contact terminals are disposed in said mounting structure.

14. The external flash unit of claim 12 wherein said third and fourth contact terminal comprise contact pins extending from said external flash unit housing by an amount sufficient to through holes in said camera housing and to contact said first and second contact terminals on a printed wiring board in said camera.

15. A one-time-use camera and detachable flash system comprising:

a one-time-use camera having a taking lens, a built-in flash unit with a first flash emission device and a first mounting structure accessible on an outer surface of the camera; and an external flash unit having a second flash emission device and a second mounting structure thereon configured to mate with the first mounting structure on the camera permitting the external flash unit to be detachably mounted on the camera with the second flash emission device spaced farther away from said taking lens than said first flash emission device, the external flash unit having a portion thereof which, when mounted on the camera, physically blocks direct illumination of a subject being photographed by flash light actually emitted from the first flash emission device;

whereby red eye effect on photographed subjects is substantially eliminated and wherein said camera includes a flash ready light and externally accessible contact terminals connected to said ready light.

16. The one-time-use camera of claim 15, wherein said first flash emission device is mounted in fixed position in said camera.

17. The one-time-use-camera of claim 15 wherein the first mounting structure comprises a pair of slots on opposing outer surfaces of the camera and the second mounting feature comprises a pair of elongated projections configured to slidably fit within said slots for mounting of said external flash unit on the camera.

18. The one-time-use-camera of claim 15 wherein the first mounting structure comprises recesses on top and bottom surfaces of the camera and the second mounting structure comprises detents positioned to engage said recesses as said external flash unit is mounted onto the camera by pressing the external flash unit onto the camera in front of said first flash emission device.

19. The one-time-use-camera of claim 15, wherein said flash unit includes a housing which serves as said portion which physically blocks said direct illumination of a subject by flash light emitted from said first flash emission device.

20. The one-time-use-camera of claim 19 wherein said housing comprises a light re-directing channel structured to direct flash light from said first flash emission device generally upward to provide a source of indirect illumination of said subject being photographed.

* * * * *